(12) United States Patent
Galvan et al.

(10) Patent No.: US 8,181,974 B1
(45) Date of Patent: May 22, 2012

(54) CLEANING CADDY APPARATUS

(76) Inventors: Gabriel Galvan, Walnut, CA (US);
Franklin H. Parada, Walnut, CA (US)

( * ) Notice: Subject to any disclaimer, the term of this patent is extended or adjusted under 35 U.S.C. 154(b) by 246 days.

(21) Appl. No.: 12/750,217

(22) Filed: Mar. 30, 2010

(51) Int. Cl.
*A47F 7/00* (2006.01)
(52) U.S. Cl. ............ 280/79.5; 280/47.35; 280/47.19
(58) Field of Classification Search ........ 280/47.35, 280/79.3, 47.17, 47.19, 47.26, 47.34, 79.11, 280/79.2, 79.5, 651, 47.18, 35
See application file for complete search history.

(56) References Cited

U.S. PATENT DOCUMENTS

| | | | |
|---|---|---|---|
| 3,555,589 A | | 1/1971 | Quimby |
| 5,380,033 A | * | 1/1995 | Harling ............ 280/654 |
| 5,704,496 A | * | 1/1998 | Latta ............ 211/70.6 |
| 6,053,516 A | | 4/2000 | Ottaway |
| 6,135,467 A | * | 10/2000 | Tagariello ............ 280/79.5 |
| 6,315,310 B1 | * | 11/2001 | Hurt ............ 280/79.5 |
| 6,454,281 B1 | * | 9/2002 | Pearson ............ 280/47.26 |
| 6,698,771 B1 | | 3/2004 | Bergeron |
| 6,935,644 B1 | | 8/2005 | Oranday |
| 7,431,313 B1 | * | 10/2008 | Torres et al. ............ 280/47.26 |
| 8,061,723 B1 | * | 11/2011 | Carroll et al. ............ 280/47.29 |

* cited by examiner

*Primary Examiner* — J. Allen Shriver, II
*Assistant Examiner* — James Triggs

(57) ABSTRACT

The cleaning caddy apparatus provides compact portability for cleaning equipment and for a plurality of easily accessed tools, pivoting uprights, a downwardly disposed bucket with dual ringer/holders, front double wheels with pivot and larger rear wheels, and extendable handle. Compact portability and stability of the apparatus is further aided by the uprights and extensions being slightly inward of each of the opposed sides. The outwardly curved arms then enable the trailing axle supports with wheels to be outwardly positioned. The twin ringer/holders provide for dual squeegee insertion, as well as use of more than one mop or any other given tools. The forwardly disposed name plate on the bucket provides for easy recognition for workers, especially in situations wherein a plurality of the apparatus are used.

8 Claims, 6 Drawing Sheets

CLEANING CADDY APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

BACKGROUND OF THE INVENTION

Various forms of mop buckets exist, as do various forms of cleaning carts. Two-wheeled carts and wheeled mop buckets are also available. Each of these devices comprises various drawbacks and shortcomings with regard to total needs involved in cleaning and making basic repairs and adjustments on a variety of surfaces and equipment. The present apparatus provides a unique cleaning and maintenance cart that provides for a plurality of needs in one unit.

FIELD OF THE INVENTION

The cleaning caddy apparatus relates to equipment caddies and more especially to an equipment caddy that has a mop bucket with two ringers, pole storage, extendable handle, and numerous tool and equipment holders.

SUMMARY OF THE INVENTION

The general purpose of the cleaning caddy apparatus, described subsequently in greater detail, is to provide a cleaning caddy apparatus which has many novel features that result in an improved cleaning caddy apparatus which is not anticipated, rendered obvious, suggested, or even implied by prior art, either alone or in combination thereof.

To attain this, the cleaning caddy apparatus provides compact portability for cleaning equipment and for various tools. In addition, the apparatus is especially advantageous in window cleaning. The numerous holders provide for storing a plurality of easily accessed tools and equipment. The most complete embodiment also features pivoting uprights that allow the uprights, extensions, and handle to be tilted backwardly. The elevated foot release negates inadvertent tilting of the uprights and provides for locking the given tilt as desired. Release of the foot release locks the uprights in the desired position.

The front double wheels pivot and thereby provide compact maneuverability along with resistance to catching on various items and surfaces. The larger rear wheels provide excellent mobility and allow a user to also lean the apparatus back on only the two rear wheels. Going up and down stairs is eased by the larger rear wheels, for example. The extendable handle, via the extensions, also provides for ease of use in various work situations and transport of the apparatus, along with providing better fit to a given user.

Further features ensure that the apparatus provides for the needs of janitors, maintenance workers, and for a host of other needs. Compact portability and stability of the apparatus is aided by the uprights and extensions being slightly inward of each of the opposed sides. The outwardly curved arms then enable the trailing axle supports with wheels to be outwardly positioned. And, providing the trailing axle supports with larger wheels further ensures ease of steering and guidance of the apparatus. The twin ringer/holders provide for dual squeegee insertion, as well as use of more than one mop or any other given tools. The name plate is important as it is easily recognized and provides workers with ease in identifying their particular apparatus, especially in situations wherein a plurality of the apparatus are used. The rearwardly and downwardly disposed compartment provides further for storage and for various uses while also providing additional stability for the apparatus.

Thus has been broadly outlined the more important features of the improved cleaning caddy apparatus so that the detailed description thereof that follows may be better understood and in order that the present contribution to the art may be better appreciated.

An object of the cleaning caddy apparatus is to provide portability for cleaning equipment and various tools.

Another object of the cleaning caddy apparatus is to provide compact portability for conveniently holding a plurality of cleaning equipments and tools.

Still another object of the cleaning caddy apparatus is to provide stable portability.

A further object of the cleaning caddy apparatus is to provide a bucket for liquids.

An added object of the cleaning caddy apparatus is to provide two ringer/holders disposed within the bucket.

And, an object of the cleaning caddy apparatus is to provide an extendable handle.

A further object of the cleaning caddy apparatus is to provide a pivoting handle.

Yet another object of the cleaning caddy apparatus is to provide for readily visible personal identification.

These together with additional objects, features and advantages of the improved cleaning caddy apparatus will be readily apparent to those of ordinary skill in the art upon reading the following detailed description of presently preferred, but nonetheless illustrative, embodiments of the improved cleaning caddy apparatus when taken in conjunction with the accompanying drawings.

In this respect, before explaining the current embodiments of the improved cleaning caddy apparatus in detail, it is to be understood that the cleaning caddy apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved cleaning caddy apparatus.

It is therefore important that the claims be regarded as including such equivalent constructions insofar as they do not depart from the spirit and scope of the cleaning caddy apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the cleaning caddy apparatus generally designated by the reference number 10 will be described.

Figure 3:
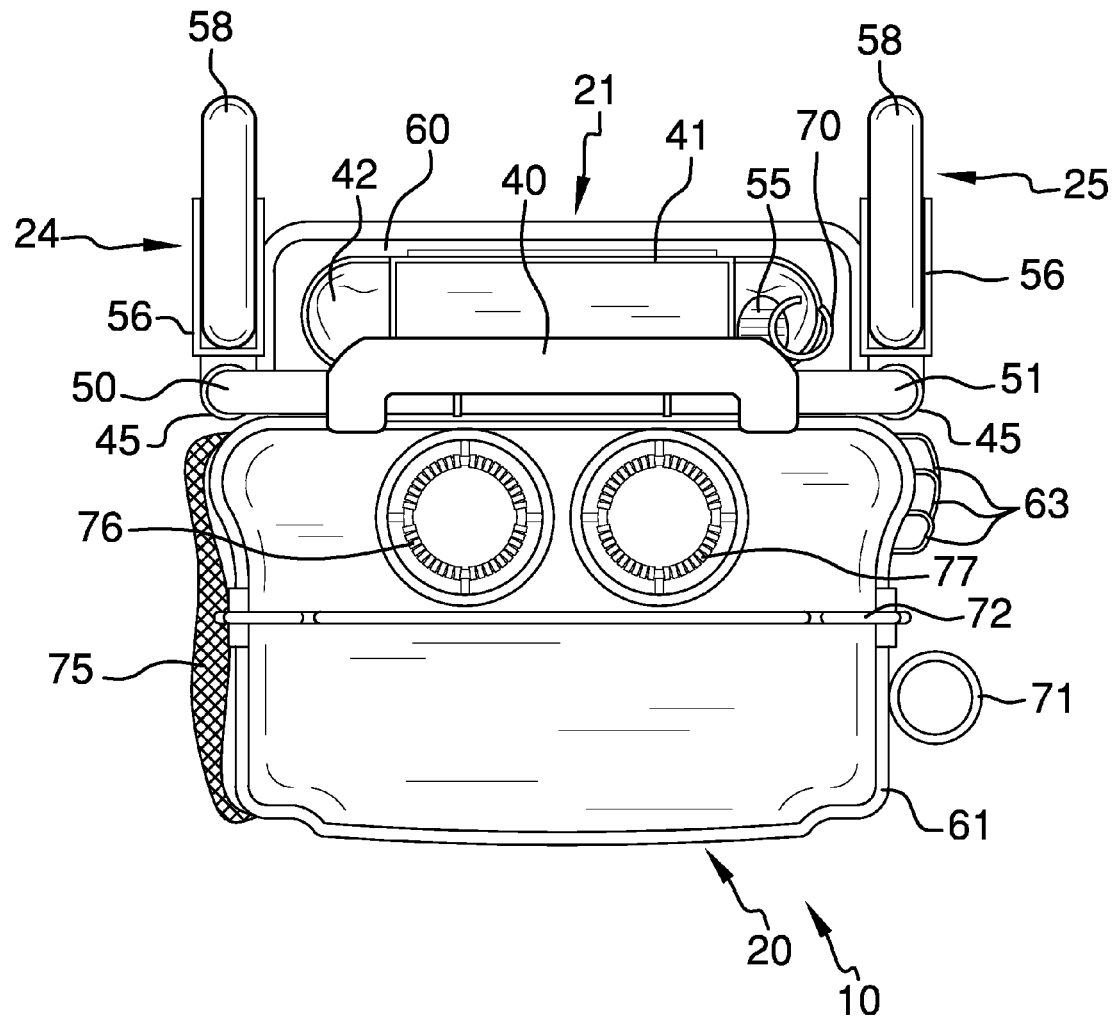
FIG. 3 is a top plan view.

Referring to FIG. 3, the apparatus 10 comprises a front 20 spaced apart from a back 21.

Figure 1:
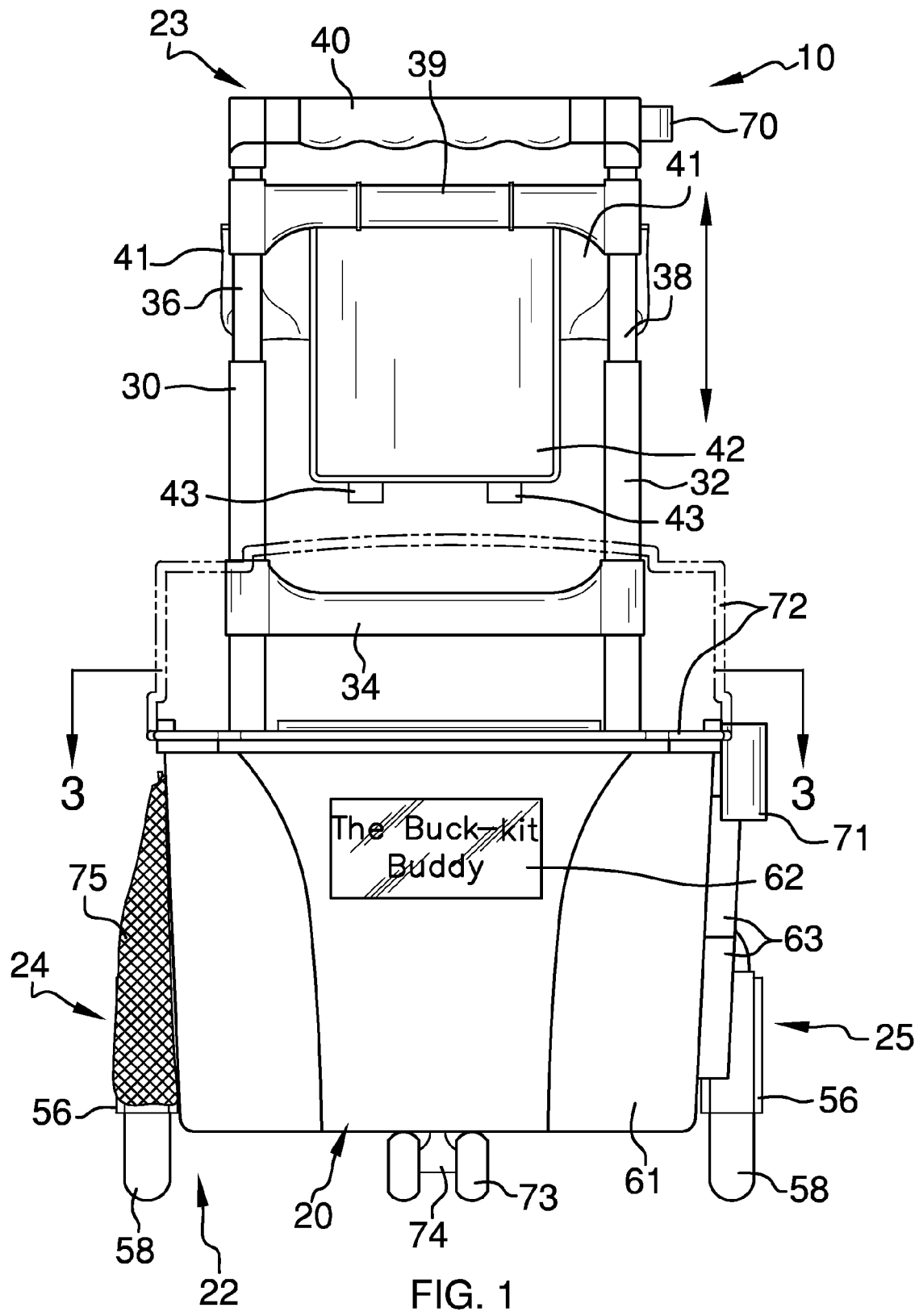
FIG. 1 is a front elevation view.

Referring to FIG. 1, the apparatus 10 comprises a top 23 spaced apart from a bottom 22, and a first side 24 spaced apart from a second side 25. The pair of spaced apart uprights comprises the first upright 30 on the first side 24 and the second upright 32 on the second side 25. The cross brace 34 is disposed about midway between the uprights.

Figure 2:
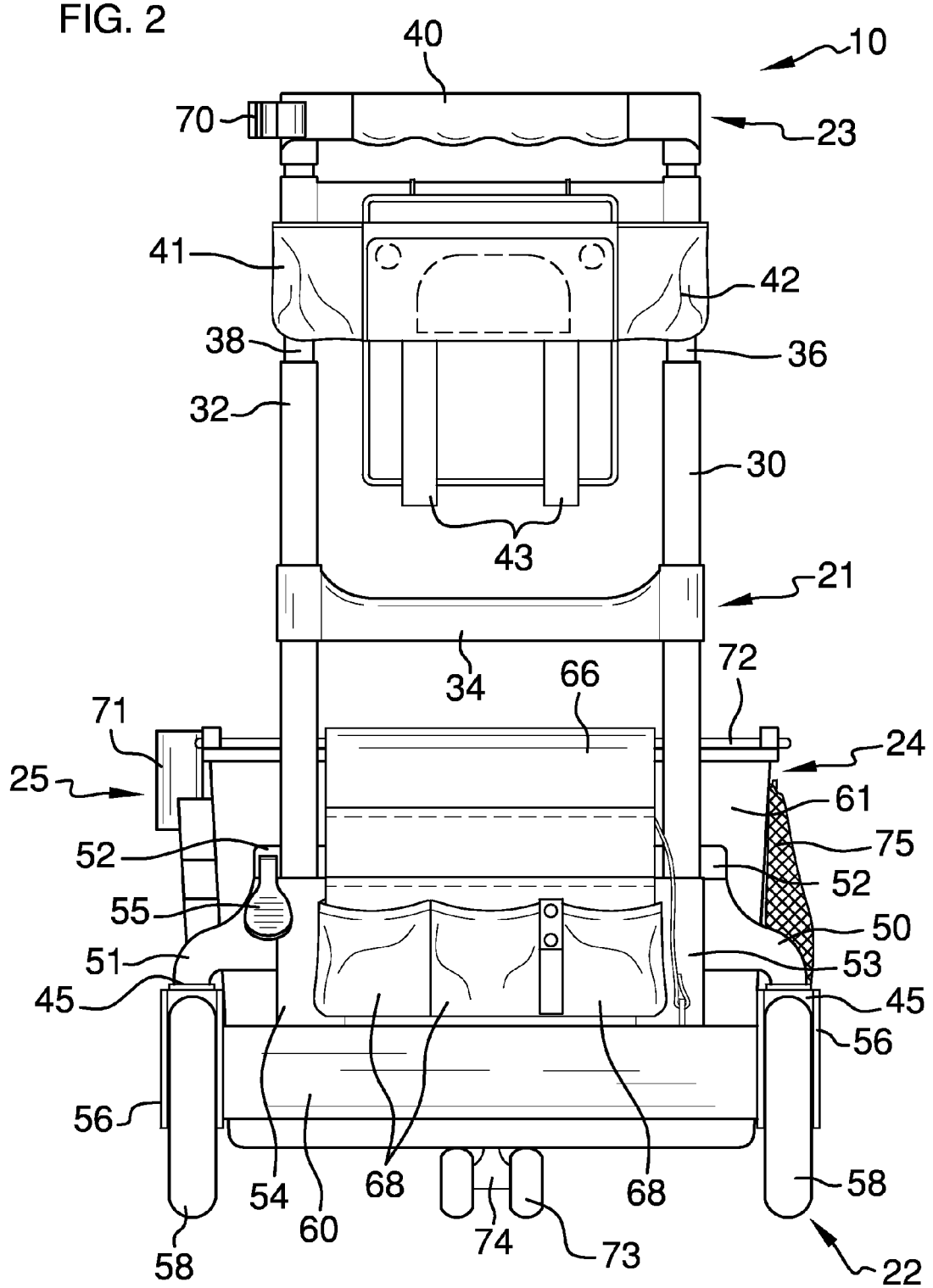
FIG. 2 is a back elevation view.

Referring to FIG. 2, the first lower upright 53 is extended downwardly from a hinge 52 connecting the first lower upright 53 to the first upright 30. The second lower upright 54 is extended downwardly from a hinge 52 connecting the second lower upright 54 to the second upright 32.

Figure 4:
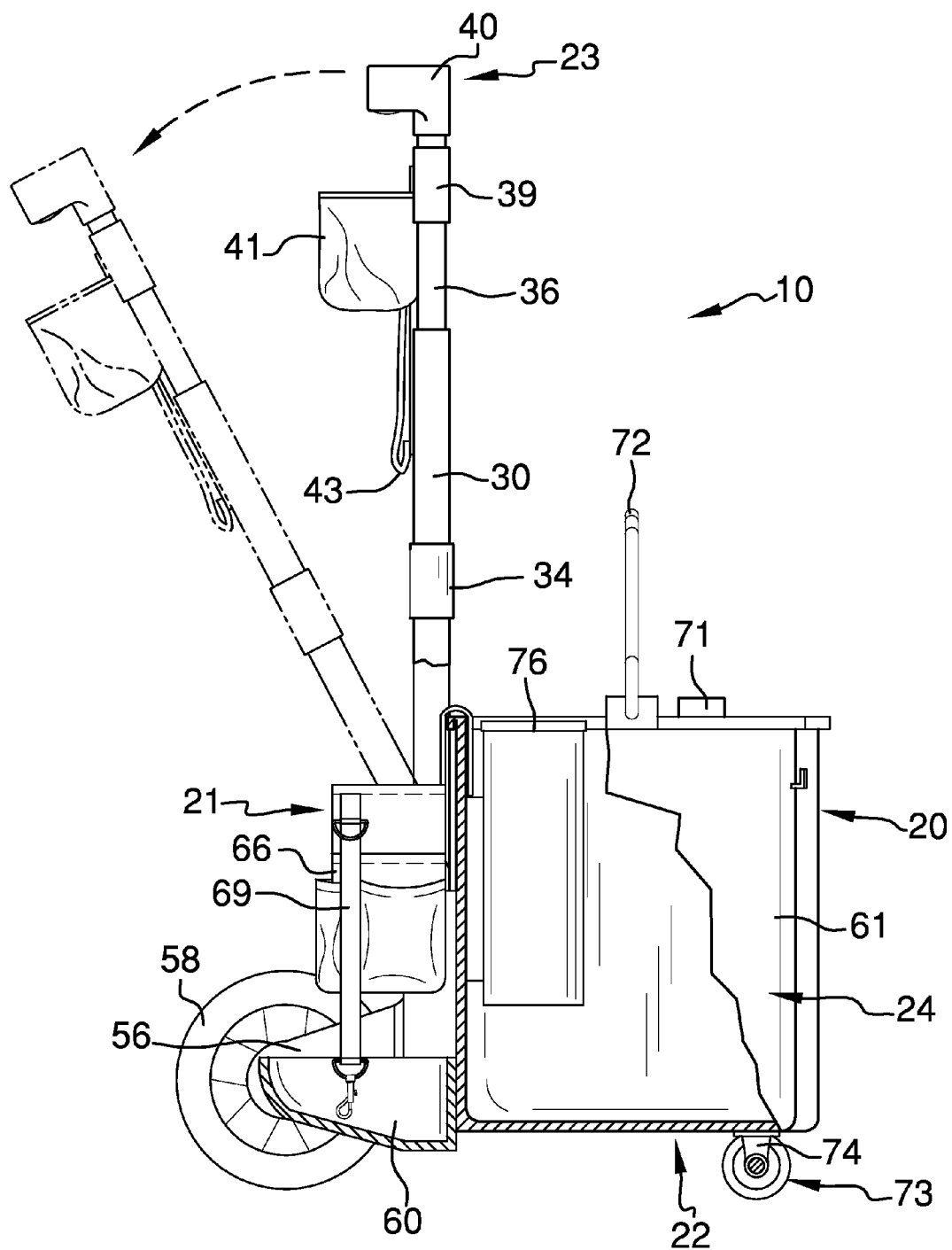
FIG. 4 is a first side elevation view, with partial cross sectional.

Continuing to refer to FIG. 2 and referring also to FIG. 4, the foot release 55 is disposed at the second side 25 hinge 52, whereby a back pivot of the uprights is selectively controlled.

Referring again to FIGS. 1 and 2, the pair of extensions comprises the first extension 36 disposed slideably within the first upright 30 and the second extension 38 disposed slideably within the second upright 32. The extension cross brace 39 is disposed between the extensions. The horizontally disposed handle 40 connects the extensions at the top 23. The first upper holder 41 is connected rearwardly and downwardly to the extension cross brace 39. The second upper holder 42 is connected to the extension cross brace 39. The second upper holder 42 is disposed at least partially below the first upper holder 41. The pair of spaced apart straps 43 is extended from the second upper holder 42. The cylindrical vertically oriented upper pole holder 70 is affixed to the handle 40 second side 25. The first outwardly curved arm 50 is affixed to the first lower upright 53.

The second outwardly curved arm 51 is affixed to the second lower upright 54. An identical cylindrical lower support 45 is affixed downwardly to each outwardly curved arm.

Figure 6:
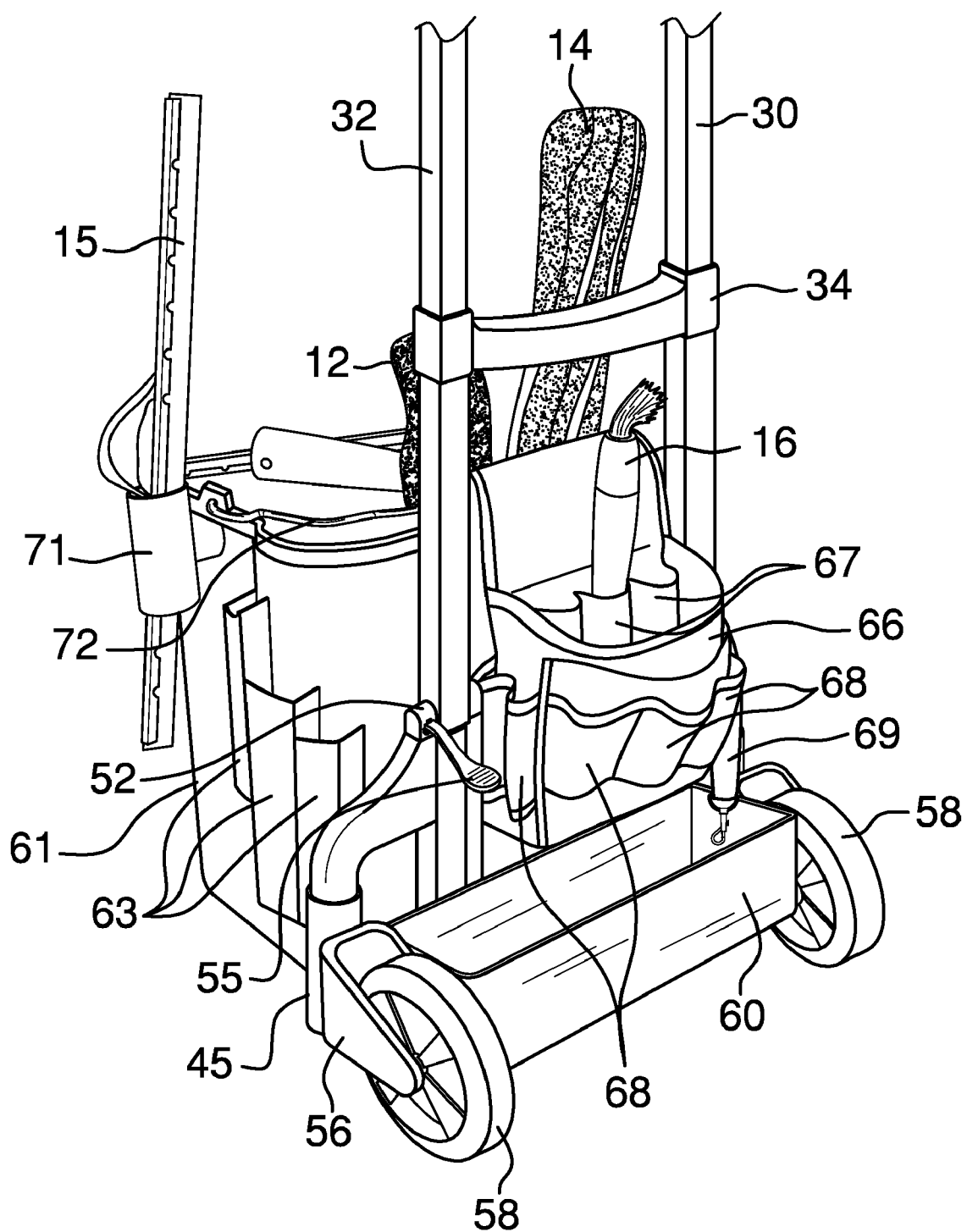
FIG. 6 is a back perspective view, with some exemplary tools installed.

Referring to FIG. 6, a trailing axle support 56 is affixed to the back 21 and rearwardly to each lower support 45. A wheel with axle 58 is affixed within each trailing axle support 56. The pliable tool holder 66 is affixed between the uprights below the cross brace 34. A plurality of internal pockets 67 is disposed within the pliable tool holder 66. A plurality of external pockets 68 is disposed outwardly on the pliable tool holder 66. The external strap with attachments 69 is affixed to the pliable tool holder 66 first side 24. The upwardly open rectangular compartment 60 is affixed between the trailing axle supports 56.

Figure 5:
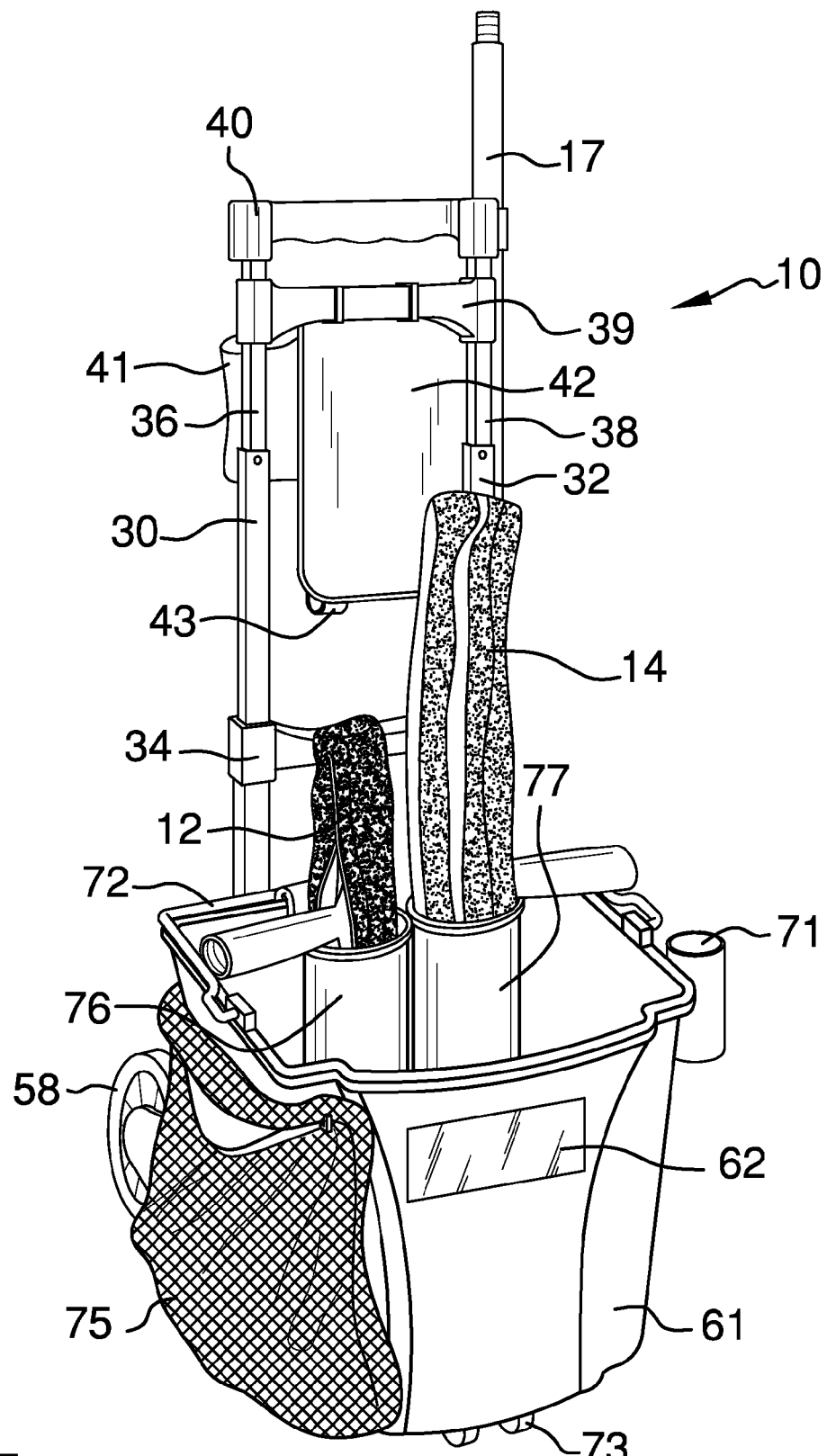
FIG. 5 is a front perspective view, with some exemplary tools inserted.

Referring to FIGS. 4 and 5, the bucket 61 is affixed forwardly to the lower uprights.

Referring again to FIGS. 3 and 5, the bucket 61 further comprises the pair of spaced apart ringer/holders comprising the first ringer/holder 76 disposed within the bucket 61 back 21 most proximal to the first side 24 and the second ringer/holder 77 disposed within the bucket 61 back 21 most proximal to the second side 25. The horizontally disposed pivoting bucket handle 72 is affixed upwardly to the bucket 61. The detachable bag 75 is affixed to the bucket 61 first side 24. The cylindrical vertically disposed lower pole holder 71 is affixed to the bucket 61 second side 25, most proximal to the bucket 61 front 20.

Referring again to FIG. 6, the plurality of hollow vertically disposed holders 63 is affixed side-by-side to the bucket 61 second side 25.

Referring again to FIGS. 1 and 5, the name plate 62 is affixed to the bucket 61 front 20. The front double wheel 73 is affixed to the bucket 61 front 20 bottom 22 by the wheel pivot 74.

Referring to FIGS. 5 and 6, exemplary use of the apparatus 10 features storage of an existing pole 17 removably fitted into the upper pole holder 70, storage of a short squeegee 12 in the first ringer/holder 76, storage of a long squeegee 14 in the second ringer/holder 77, storage of a scraper/squeegee 15 in the lower pole holder 71, and storage of a brush 16 in one of the internal pockets 67 of the pliable tool holder 66.

With respect to the above description then, it is to be realized that the optimum dimensional relationships for the parts of the cleaning caddy apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the cleaning caddy apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the cleaning caddy apparatus may be used.

Therefore, the foregoing is considered as illustrative only of the principles of the cleaning caddy apparatus. Further, since numerous modifications and changes will readily occur to those skilled in the art, it is not desired to limit the cleaning caddy apparatus to the exact construction and operation shown and described, and accordingly, all suitable modifications and equivalents may be resorted to, falling within the scope of the cleaning caddy apparatus.

What is claimed is:

1. A cleaning caddy apparatus comprising, in combination:
 a front spaced apart from a back, a top spaced apart from a bottom, and a first side spaced apart from a second side;
 a pair of spaced apart uprights comprising a first upright on the first side and a second upright on the second side;
 a cross brace disposed about midway between the uprights;
 a pair of extensions comprising a first extension disposed slideably within the first upright, a second extension disposed slideably within the second upright;
 a extension cross brace disposed between the extensions;
 a horizontally disposed handle connecting the extensions at the top;
 a first upper holder connected rearwardly and downwardly to the extension cross brace;
 a second upper holder connected to the extension cross brace, the second upper holder disposed at least partially below the first upper holder;
 a pair of spaced apart straps extended from the second upper holder;
 a first outwardly curved arm affixed downwardly to the first upright;
 a second outwardly curved arm affixed downwardly to the second upright;
 an identical cylindrical lower support affixed downwardly to each outwardly curved arm;
 a trailing axle support affixed to the back and rearwardly to each lower support;

a wheel with axle affixed within each trailing axle support;
a pliable tool holder affixed between the uprights below the cross brace;
a plurality of internal pockets disposed within the pliable tool holder;
a plurality of external pockets disposed outwardly on the pliable tool holder;
an external strap with attachments affixed to the pliable tool holder first side;
an upwardly open rectangular compartment affixed between the trailing axle supports;
a bucket affixed forwardly to the lower uprights, the bucket further comprising:
  a pair of spaced apart ringer/holders comprising a first ringer/holder disposed within the bucket back and most proximal to the first side, a second ringer/holder disposed within the bucket back most proximal to the second side;
  a horizontally disposed pivoting bucket handle affixed upwardly to the bucket;
  a detachable bag affixed to the bucket first side;
  a cylindrical vertically disposed lower pole holder affixed to the bucket second side, most proximal to the bucket front;
  a plurality of hollow vertically disposed holders affixed side-by-side to the bucket second side;
  a name plate affixed to the bucket front;
  a front double wheel affixed to the bucket front bottom by a wheel pivot.

2. The apparatus according to claim 1 further comprising a cylindrical vertically oriented upper pole holder affixed to the handle second side.

3. The apparatus according to claim 2 further comprising a cylindrical vertically disposed lower pole holder affixed to the bucket second side, most proximal to the bucket front.

4. The apparatus according to claim 1 wherein the foot release further locks the uprights in a desired position.

5. The apparatus according to claim 2 wherein the foot release further locks the uprights in a desired position.

6. The apparatus according to claim 3 wherein the foot release further locks the uprights in a desired position.

7. A cleaning caddy apparatus comprising, in combination:
a front spaced apart from a back, a top spaced apart from a bottom, and a first side spaced apart from a second side;
a pair of spaced apart uprights comprising a first upright on the first side and a second upright on the second side;
a cross brace disposed about midway between the uprights;
a first lower upright extended downwardly from a hinge connecting the first lower upright to the first upright;
a second lower upright extended downwardly from a hinge connecting the second lower upright to the second upright;
a foot release disposed at the second side hinge, whereby a back pivot of the uprights is selectively controlled;
a pair of extensions comprising a first extension disposed slideably within the first upright, a second extension disposed slideably within the second upright;
a extension cross brace disposed between the extensions;
a horizontally disposed handle connecting the extensions at the top;
a first upper holder connected rearwardly and downwardly to the extension cross brace;
a second upper holder connected to the extension cross brace, the second upper holder disposed at least partially below the first upper holder;
a pair of spaced apart straps extended from the second upper holder;
a cylindrical vertically oriented upper pole holder affixed to the handle second side;
a first outwardly curved arm affixed to the first lower upright;
a second outwardly curved arm affixed to the second lower upright;
an identical cylindrical lower support affixed downwardly to each outwardly curved arm;
a trailing axle support affixed to the back and rearwardly to each lower support;
a wheel with axle affixed within each trailing axle support;
a pliable tool holder affixed between the uprights below the cross brace;
a plurality of internal pockets disposed within the pliable tool holder;
a plurality of external pockets disposed outwardly on the pliable tool holder;
an external strap with attachments affixed to the pliable tool holder first side;
an upwardly open rectangular compartment affixed between the trailing axle supports;
a bucket affixed forwardly to the lower uprights, the bucket further comprising:
  a pair of spaced apart ringer/holders comprising a first ringer/holder disposed within the bucket back and most proximal to the first side, a second ringer/holder disposed within the bucket back most proximal to the second side;
  a horizontally disposed pivoting bucket handle affixed upwardly to the bucket;
  a detachable bag affixed to the bucket first side;
  a cylindrical vertically disposed lower pole holder affixed to the bucket second side, most proximal to the bucket front;
  a plurality of hollow vertically disposed holders affixed side-by-side to the bucket second side;
  a name plate affixed to the bucket front;
  a front double wheel affixed to the bucket front bottom by a wheel pivot.

8. The apparatus according to claim 7 wherein the foot release further locks the uprights in a desired position.

* * * * *